US012583759B2

(12) United States Patent
Qi et al.

(10) Patent No.: US 12,583,759 B2
(45) Date of Patent: Mar. 24, 2026

(54) ALKALI METAL-DOPED AND ALKALINE EARTH METAL-DOPED POSITIVE ELECTRODE MATERIALS AND METHODS OF MANUFACTURING THE SAME

(71) Applicant: GM GLOBAL TECHNOLOGY OPERATIONS LLC, Detroit, MI (US)

(72) Inventors: Gongshin Qi, Troy, MI (US); Devendrasinh Darbar, Sterling Heights, MI (US); Raneen Taha, Sterling Heights, MI (US); Wei Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 469 days.

(21) Appl. No.: 18/306,910

(22) Filed: Apr. 25, 2023

(65) Prior Publication Data

US 2024/0360003 A1     Oct. 31, 2024

(51) Int. Cl.
| | |
|---|---|
| *H01M 4/525* | (2010.01) |
| *C01G 53/50* | (2025.01) |
| *C01G 53/82* | (2025.01) |
| *H01M 4/505* | (2010.01) |

(52) U.S. Cl.
CPC ............. *C01G 53/50* (2013.01); *C01G 53/82* (2025.01); *H01M 4/505* (2013.01); *H01M 4/525* (2013.01); *C01P 2004/90* (2013.01); *C01P 2006/40* (2013.01)

(58) Field of Classification Search
None
See application file for complete search history.

(56) References Cited

U.S. PATENT DOCUMENTS

| | | | |
|---|---|---|---|
| 2019/0372112 A1* | 12/2019 | Peralta | ................. H01M 4/131 |
| 2022/0352511 A1 | 11/2022 | Qi et al. | |
| 2023/0048577 A1 | 2/2023 | Qi et al. | |

OTHER PUBLICATIONS

U.S. Appl. No. 17/897,959, Inventors: Meng Jiang, et al., Electroactive Materials for Electrochemical Cells and Methods of Forming the Same, filed Aug. 29, 2022.
U.S. Appl. No. 17/882,936, Inventors: Gongshin Oi, et al., Lithium-Rich, Manganese-Rich Layered Electroactive Materials and Methods of Forming the Same, filed Aug. 8, 2022.
U.S. Appl. No. 17/742,037, Inventors: Gongshin Oi, et al., Lithium-Containing Particle Coatings for Positive Electroactive Materials, filed May 11, 2022.
U.S. Appl. No. 17/507,479 Inventors: Gongshin Qi, et al., Method of Coating Electroactive Materials With Conductive Polymers, filed Oct. 21, 2021.
U.S. Appl. No. 17/976,400 Inventors: Lei Wang, et al., Electrolytes for Lithium-Rich, Layered Cathodes, filed Oct. 28, 2022.

(Continued)

*Primary Examiner* — Carlos Barcena

(57) ABSTRACT

A positive electrode material including a layered lithium- and manganese-rich nickel oxide (LMR) doped with an alkali metal and/or an alkaline earth metal. The positive electrode material may be manufactured by preparing a mixture comprising a transition metal carbonate, a dopant metal carbonate, and a lithium source, and then calcining the mixture to form the alkali metal and/or alkaline earth metal-doped LMR.

20 Claims, 1 Drawing Sheet

(56)     References Cited

OTHER PUBLICATIONS

U.S. Appl. No. 17/978,462, Inventors: Lei Wang, et al., Electrolytes
for Lithium-Rich, Layered Cathodes, filed Nov. 1, 2022.
U.S. Appl. No. 17/853,363, Inventors: Lei Wang, et al., Electrolyte
Additives for Lithium-Rich, Layered Cathodes, filed Jun. 29, 2022.

* cited by examiner 10
26
24
20
22
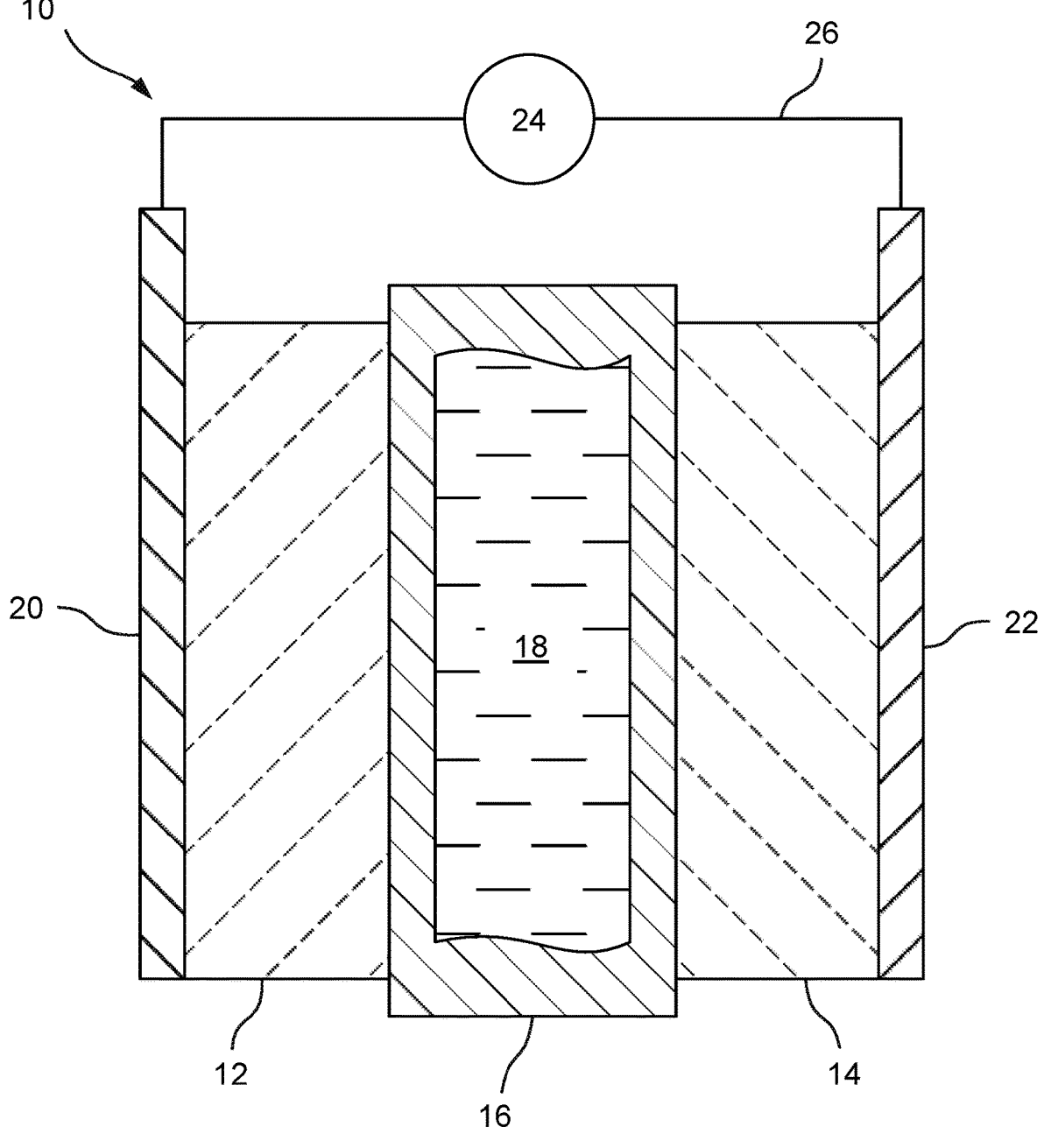
18
12
16
14

1

ALKALI METAL-DOPED AND ALKALINE EARTH METAL-DOPED POSITIVE ELECTRODE MATERIALS AND METHODS OF MANUFACTURING THE SAME

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to positive electrode materials for electrochemical cells that cycle lithium ions, and more particularly to positive electrode materials including lithium and manganese-rich oxides that have been doped with alkali metals and/or alkaline earth metals.

Layered lithium and manganese-rich oxides (LMR) are attractive candidates for positive electrode materials of electrochemical cells that cycle lithium ions due to their relatively high capacity (e.g., >250 mAh/g), thermal stability, and relatively low cost. However, LMR has been found to exhibit voltage decay, low coulombic efficiency, and irreversible capacity loss after repeated charge and discharge cycles. One proposed mechanism for the observed performance degradation is that LMR undergoes an irreversible phase transition from a layered structure to a spinel structure when substantial amounts of lithium are removed from the LMR during electrochemical charging. This layered-to-spinel phase transformation has been found to be detrimental to the electrochemical performance of lithium batteries, which may be due to the relatively poor electrochemical performance of spinel phase and because the presence of spinel phases within the layered crystal structure of the LMR impedes the diffusion of lithium ions during cycling.

It would be desirable to develop layered lithium and manganese-rich oxide materials with increased resistance to phase transformations during cycling, particularly at high voltages.

SUMMARY

A positive electrode material for an electrochemical cell that cycles lithium ions is disclosed. The positive electrode material comprises an oxide represented by the formula (1):

$$Li_{1.2-x}A_x[Mn_{0.8-x-y-z}Ni_yMe_z]O_2, \qquad (1)$$

where A is an alkali metal, an alkaline earth metal, or a combination thereof, Me is a transition metal, $0<x\leq0.12$, $0.1\leq y\leq0.5$, and $0\leq z\leq0.2$.

In aspects, A may be a metal selected from the group consisting of sodium (Na), potassium (K), rubidium (Rb), cesium (Cs), magnesium (Mg), calcium (Ca), strontium (Sr), barium (Ba), and combinations thereof.

In aspects, A may be a metal selected from the group consisting of rubidium (Rb), cesium (Cs), and combinations thereof.

In aspects, Me may be a transition metal selected from the group consisting of cobalt (Co), aluminum (Al), and combinations thereof.

In aspects, z=0, x is greater than or equal to about 0.001 and less than or equal to about 0.05, and y is greater than or equal to about 0.2 and less than or equal to about 0.3.

The oxide may have a layered crystal structure including a transition metal layer, an oxygen layer, and a lithium layer. In such case, the A may be present at an octahedral site within the lithium layer.

A method of manufacturing a positive electrode material for an electrochemical cell that cycles lithium ions is disclosed. In the method a mixture comprising a transition metal carbonate, a dopant metal carbonate, and a lithium source is prepared and calcined to form an oxide represented by the formula (1):

$$Li_{1.2-x}A_x[Mn_{0.8-x-y-z}Ni_yMe_z]O_2, \qquad (1)$$

where A is the dopant metal, Me is a metal selected from the group consisting of cobalt (Co), aluminum (Al), and combinations thereof, $0<x\leq0.12$, $0.1\leq y\leq0.5$, and $0\leq z\leq0.2$.

The transition metal carbonate comprises nickel and manganese. The dopant metal carbonate comprises a dopant metal selected from the group consisting of sodium (Na), potassium (K), rubidium (Rb), cesium (Cs), magnesium (Mg), calcium (Ca), strontium (Sr), barium (Ba), and combinations thereof.

A molar ratio of the dopant metal to lithium in the mixture may be greater than or equal to about 0.005 and less than or equal to about 0.1.

The transition metal carbonate may comprise manganese nickel carbonate. A molar ratio of manganese to nickel in the transition metal carbonate may be greater than or equal to about one (1) to less than or equal to about 5.

The dopant metal may comprise rubidium (Rb), cesium (Cs), or a combination thereof.

The transition metal carbonate may further comprise cobalt (Co), aluminum (Al), or a combination thereof.

The lithium source may comprise lithium metal, a lithium salt, or a combination thereof.

The mixture may be calcined by heating the mixture in an oxygen-containing environment at a temperature of about 700 degrees Celsius to about 1000 degrees Celsius for about 12 hours to about 36 hours.

The mixture may be calcined by heating the mixture in an oxygen-containing environment from ambient temperature to a temperature of about 900 degrees Celsius at ramp rate of about 2 degrees Celsius per minute, and then maintaining the mixture at a temperature of about 900 degrees Celsius for about 12 hours.

The method may further comprise, prior to calcining the mixture, grinding the transition metal carbonate, the dopant metal carbonate, and the lithium source together to form a powder.

The method may further comprise preparing a precursor solution comprising a metal salt in a solvent. The metal salt may comprise nickel and manganese. An ammonium carbonate solution may be introduced into the precursor solution to form a slurry including a liquid phase and a solid precipitate phase comprising the transition metal carbonate. The method may further comprise separating the solid precipitate phase from the liquid phase.

The metal salt may further comprise the dopant metal. In such case, the solid precipitate phase may further comprise the dopant metal carbonate.

The metal salt may comprise a carbonate, nitrate, sulfate, acetate, oxalate, or a combination thereof. The solvent may comprise water.

The precursor solution may comprise metal cations and the ammonium carbonate solution may comprise ammonium cations ($[NH_4]^+$). In such case, a molar ratio of the metal cations in the precursor solution to the ammonium cations in the ammonium carbonate solution may be greater than or equal to about 0.03 and less than or equal to about 0.04.

The method may further comprise adjusting the pH of the slurry such that the slurry exhibits a pH of greater than or equal to about 7 and less than or equal to about 9.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a schematic cross-sectional view of an electrochemical cell that cycles lithium ions, the electrochemical cell comprises a positive electrode, a negative electrode, a porous separator, and an electrolyte.

In the drawings, reference numbers may be reused to identify similar and/or identical elements.

DETAILED DESCRIPTION

A positive electrode material according to the present disclosure comprises a layered lithium- and manganese-rich nickel oxide (LMR) that has been doped with an alkali metal and/or an alkaline earth metal (doped-LMR). Electrochemical cells including the presently disclosed doped-LMR positive electrode materials have been found to exhibit improved electrochemical performance, e.g., improved capacity retention, as compared to electrochemical cells in which undoped LMR is used as the positive electrode material.

LMRs have a layered crystal structure with a repeating transition metal (TM) layer, oxygen layer, and lithium (Li) layer. During electrochemical charging, the LMRs are delithiated and Li ions are removed from the Li layer, leaving behind vacancies within the Li layer. In some instances, the formation of three adjacent Li vacancies (a Li tri-vacancy) within the Li layer may create an opportunity for a TM ion (e.g., a manganese ion) located at an octahedral site within the TM layer to migrate to a face-sharing tetrahedral site within the Li layer at the location of the Li tri-vacancy. The migration of a TM ion from the TM layer to a tetrahedral site within the Li layer may facilitate the formation of undesirable spinel phase. Without intending to be bound by theory, it is believed that, in the doped-LMR positive electrode materials of the present disclosure, the alkali metal and/or alkaline earth metal ions may replace some of the Li ions in the Li layer. And the relatively large ionic radius of the alkali metal and/or alkaline earth metal ions may inhibit the migration of TM ions from octahedral sites within the TM layer to tetrahedral sites within the Li layer, even when a high Li ion vacancy concentration exists in the Li layer. In this way, doping LMRs with alkali metals and/or alkaline earth metals is believed to inhibit the formation of spinel phases during electrochemical charging and dilithiation of the doped-LMRs and thus may help maintain the layered structure and electrochemical performance characteristics of the doped-LMRs.

As used herein, the phrase "alkali metal" refers to an element in Group 1 of the periodic table of the chemical elements, as designated by the International Union of Pure and Applied Chemistry (IUPAC), and includes, e.g., sodium (Na), potassium (K), rubidium (Rb), and cesium (Cs). The phrase, "alkaline earth metal," as used herein, refers to an element of Group 2 of the periodic table of the chemical elements, as designated by the IUPAC, and includes, e.g., magnesium (Mg), calcium (Ca), strontium (Sr), and barium (Ba).

FIG. 1, depicts a schematic side cross-sectional view of an electrochemical cell 10 that cycles lithium ions. The electrochemical cell 10 comprises a positive electrode 12, a negative electrode 14, a separator 16, and an electrolyte 18. The positive electrode 12 is disposed on a major surface of a positive electrode current collector 20 and the negative electrode 14 is disposed on a major surface of a negative electrode current collector 22. In practice, the positive and negative electrode current collectors 20, 22 may be electrically coupled to a power source or load 24 via an external circuit 26.

The electrochemical cell 10 may be used in secondary lithium batteries for vehicle or automotive transportation applications (e.g., motorcycles, boats, tractors, buses, motorcycles, mobile homes, campers, and tanks), as well as in a wide variety of other industries and applications, including aerospace components, consumer products, devices, buildings (e.g., houses, offices, sheds, and warehouses), office equipment and furniture, and industrial equipment machinery, agricultural or farm equipment, or heavy machinery, by way of non-limiting example. In certain aspects, the electrochemical cell 10 may be used in secondary lithium batteries for hybrid electric vehicles (HEVs) and/or electric vehicles (EVs).

The positive electrode 12 is configured to store and release lithium ions during discharge and charge of the electrochemical cell 10 and may be in the form of a continuous porous layer disposed on the major surface of the positive electrode current collector 20. The positive electrode 12 includes at least one electrochemically active (electroactive) material that can facilitate the storage and release of lithium ions by undergoing a reversible redox reaction with lithium. At least one of the electroactive materials of the positive electrode 12 comprises a layered lithium- and manganese-rich nickel oxide that has been doped with an alkali metal and/or an alkaline earth metal (doped-LMR). The alkali metal and/or an alkaline earth metal doped-LMR electroactive material of the positive electrode 12 is represented by the formula (1):

$$Li_{1.2-x}A_x[Mn_{0.8-x-y-z}Ni_yMe_z]O_2, \qquad (1)$$

where A is an alkali metal, an alkaline earth metal, or a combination thereof, Me is a transition metal, $0 < x \leq 0.12$, $0.1 \leq y \leq 0.5$, and $0 \leq z \leq 0.2$. For example, A may be a metal selected from the group consisting of sodium (Na), potassium (K), rubidium (Rb), cesium (Cs), magnesium (Mg), calcium (Ca), strontium (Sr), barium (Ba), and combinations thereof, and Me may be a transition metal selected from the group consisting of cobalt (Co), aluminum (Al), and combinations thereof. In aspects, A may be Rb and/or Cs. In aspects, x may be greater than or equal to about zero (0), optionally about 0.001, or optionally about 0.005 and less than or equal to about 0.12, optionally about 0.1, or optionally about 0.05. For example, in aspects, x may be about 0.01. In other words, a molar ratio of A to Li in the doped-LMR electroactive material of formula (1) may be greater than or equal to about 0.005, optionally about 0.008, or optionally about 0.01 and less than or equal to about 0.1, or optionally about 0.05. In aspects, y may be greater than or equal to about 0.1, or optionally about 0.2 and less than or equal to about 0.5, or optionally about 0.3. For example, in aspects, y may be about 0.24. In other words, a molar ratio of Mn to Ni in the doped-LMR electroactive material of formula (1) may be greater than or equal to about one (1), optionally about 2, or optionally about 3, and less than or equal to about 5, or optionally about 4. In aspects, z may be greater than or equal to 0 and less than or equal to about 0.2. For example, in aspects, z may be 0. In such case, the doped-LMR electroactive material of formula (1) may be substantially free of Co and/or Al. In some aspects, manganese (Mn) and nickel (Ni) may be the only transition metals in the doped-LMR electroactive material of formula (1).

The doped-LMR electroactive material of formula (1) may have a layered crystal structure with a repeating transition metal (TM) layer, oxygen layer, and lithium (Li) layer. The TM layer may comprise the Mn ions, Ni ions, and the optional Me ions (Co and/or Al). In some aspects, the TM layer also may comprise Li ions. The alkali metal and/or alkaline earth metal (A) ions may be present within the layered crystal structure of the doped-LMR electroactive material of formula (1). For example, the A metal ions may be present at octahedral sites within the Li layer. In other words, the LMR may be substitutionally doped with the A metal ions, with an A metal ion replacing a Li ion in the Li layer. As another example, the A metal ions may be present at octahedral sites within the TM layer. In other words, the LMR may be substitutionally doped with the A metal ions, with an A metal ion replacing a Li ion in the TM layer.

In aspects, the doped-LMR electroactive material of formula (1) may be in particle form. In such, particles of the doped-LMR electroactive material of formula (1) may be substantially spherical and may have aspect ratios close to one (1). For example, particles of the doped-LMR electroactive material of formula (1) may be substantially spherical and may have aspect ratios of less than 10.

The doped-LMR electroactive material of formula (1) may be present in the positive electrode 12 in an amount, by weight, greater than or equal to about 30 wt. %, greater than or equal to about 40 wt. %, greater than or equal to about 50 wt. %, greater than or equal to about 60 wt. %, greater than or equal to about 70 wt. %, greater than or equal to about 80 wt. %, greater than or equal to about 90 wt. %, greater than or equal to about 96 wt. %, or about 98 wt. %; or from about 30 wt. % to about 98 wt. %, about 40 wt. % to about 98 wt. %, about 40 wt. % to about 96 wt. %, about 40 wt. % to about 90 wt. %, about 40 wt. % to about 80 wt. %, about 40 wt. % to about 70 wt. %, about 40 wt. % to about 60 wt. %, or about 40 wt. % to about 50 wt. %.

In some embodiments, the electroactive material of the positive electrode 12 may comprise, in addition to the doped-LMR electroactive material of formula (1), a material that can undergo lithium intercalation and deintercalation or can undergo a conversion by reaction with lithium. In aspects, the electroactive material of the positive electrode 12 may comprise an intercalation host material that can undergo the reversible insertion or intercalation of lithium ions. In such case, the electroactive material of the positive electrode 12 may comprise a layered oxide represented by the formula $LiMeO_2$, an olivine-type oxide represented by the formula $LiMePO_4$, a monoclinic-type oxide represented by the formula $Li_3Me_2(PO_4)_3$, a spinel-type oxide represented by the formula $LiMe_2O_4$, a tavorite represented by one or both of the following formulas $LiMeSO_4F$ or $LiMePO_4F$, or a combination thereof, where Me is a transition metal (e.g., Co, Ni, Mn, Fe, Al, V, or a combination thereof). In aspects, the electroactive material of the positive electrode 12 may comprise lithium manganese iron phosphate (LMFP), e.g., $LiMn_{0.7}Fe_{0.3}PO_4$, lithium iron phosphate (LFP), lithium manganese oxide (LMO), e.g., $LiMn_2O_4$, and combinations thereof.

The electroactive material of the positive electrode 12 may be a particulate material and particles of the electroactive material of the positive electrode 12 may be intermingled with a polymer binder, for example, to provide the positive electrode 12 with structural integrity. Examples of polymer binders include polyvinylidene fluoride (PVDF), polytetrafluoroethylene (PTFE), ethylene propylene diene monomer (EPDM) rubber, styrene butadiene rubber (SBR), carboxymethyl cellulose (CMC), nitrile butadiene rubber (NBR), styrene-butadiene rubber (SBR), styrene ethylene butylene styrene copolymer (SEBS), polyacrylates, alginates, polyacrylic acid, and combinations thereof. In aspects, the positive electrode 12 may comprise a polymer binder comprising polyvinylidene fluoride.

The positive electrode 12 optionally may include particles of an electrically conductive material. Examples of electrically conductive materials include carbon-based materials, metals (e.g., nickel), and/or electrically conductive polymers. Examples of electrically conductive carbon-based materials include carbon black (CB) (e.g., acetylene black), graphite, graphene (e.g., graphene nanoplatelets, GNP), graphene oxide, carbon nanotubes (CNT), and/or carbon fibers (e.g., carbon nanofibers). Examples of electrically conductive polymers include polyaniline, polythiophene, polyacetylene, and/or polypyrrole. In aspects, the electrically conductive material of the positive electrode 12 may comprise carbon black.

The negative electrode 14 is configured to store and release lithium ions during charge and discharge of the electrochemical cell 10 and may be in the form of a continuous porous or nonporous layer of material disposed on a major surface of the negative electrode current collector 24. The negative electrode 14 includes one or more electroactive materials that can facilitate the storage and release of lithium ions by undergoing a reversible redox reaction with lithium at a lower electrochemical potential than the electroactive material of the positive electrode 12 such that an electrochemical potential difference exists between the positive and negative electrodes 12, 14. Examples of electroactive materials for the negative electrode 14 include lithium, lithium alloys (e.g., alloys of lithium and silicon, aluminum, indium, tin, or a combination thereof), graphite, activated carbon, carbon black, hard carbon, soft carbon, graphene, silicon, silicon-based materials (e.g., alloys if silicon and tin, iron, aluminum, cobalt, or a combination thereof and/or composites of silicon and/or silicon oxide and carbon), tin oxide, aluminum, indium, zinc, germanium, silicon oxide, lithium silicon oxide, lithium silicide, titanium oxide, lithium titanate, and combinations thereof. In some aspects, the negative electrode 22 may be in the form of a nonporous metal film or foil, such as a lithium metal film or lithium-containing foil. In other aspects, the electroactive material of the negative electrode 14 may be a particulate material and particles of the electroactive material of the negative electrode 14 may be intermingled with a polymer binder and/or particles of an electrically conductive material. The same polymer binders and/or electrically conductive materials disclosed above with respect to the positive electrode 12 may be used in the negative electrode 14.

The separator 16 physically separates and electrically isolates the positive and negative electrodes 12, 14 from each other while permitting lithium ions to pass therethrough. The separator 16 exhibits an open microporous structure and may comprise an organic and/or inorganic material that can physically separate and electrically insulate the positive and negative electrodes 12, 14 from each other while permitting the free flow of ions therebetween. For example, the separator 16 may comprise a non-woven material, e.g., a manufactured sheet, web, or mat of directionally or randomly oriented fibers. As another example, the separator 16 may comprise a microporous membrane or film. The non-woven material and/or the microporous membrane of the separator 16 may comprise a polymeric material. For example, the separator 16 may comprise a polyolefin-based material having the general formula $(CH_2CH_R)_n$, where R is an alkyl group. In aspects, the separator 16 may comprise a single polyolefin or a combination of polyolefins. Examples of polyolefins include polyethylene (PE), polypropylene (PP), polyamide (PA), poly(tetrafluoroethylene) (PTFE), polyvinylidene fluoride (PVdF), poly(vinyl chloride) (PVC), and/or polyacetylene. Examples of other polymeric materials that may be included in or used to form the separator 16 include cellulose, polyimide, copolymers of polyolefins and polyimides, poly(lithium 4-styrene-sulfonate)-coated polyethylene, polyetherimide (PEI), bisphenol-acetone diphthalic anhydride (BPADA), para-phenylenediamine, poly(m-phenylene isophthalamide) (PMIA), and/or expanded polytetrafluoroethylene reinforced polyvinylidenefluoride-hexafluoropropylene.

The electrolyte 18 provides a medium for the conduction of lithium ions through the electrochemical cell 10 between the positive and negative electrodes 12, 14 and may be in solid, liquid, or gel form. In aspects, the electrolyte 18 may comprise a non-aqueous liquid electrolyte solution including a lithium salt dissolved in a non-aqueous aprotic organic solvent or a mixture of non-aqueous aprotic organic solvents. Non-limiting examples of lithium salts include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate (LiB$(C_2O_4)_2$) (LiBOB), lithium difluorooxalatoborate (LiBF$_2$($C_2O_4$)), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), lithium (triethylene glycol dimethyl ether)bis(trifluoromethanesulfonyl)imide (Li(G3)(TFSI), lithium bis(trifluoromethanesulfonyl)azanide (LiTFSA), and combinations thereof. Non-limiting examples of non-aqueous aprotic organic solvents include cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane).

The positive and negative electrode current collectors 20, 22 are electrically conductive and provide an electrical connection between the external circuit 26 and their respective positive and negative electrodes 12, 14. In aspects, the positive and negative electrode current collectors 20, 22 may be in the form of nonporous metal foils, perforated metal foils, porous metal meshes, or a combination thereof. The negative electrode current collector 22 may be made of copper, nickel, or alloys thereof, stainless steel, or other appropriate electrically conductive material. The positive electrode current collector 20 may be made of aluminum (Al) or another appropriate electrically conductive material.

Methods

The doped-LMR electroactive material of formula (1) may be prepared by a two-stage process. In a first stage, metal carbonate precursors may be prepared via a carbonate co-precipitation method. In a second stage, a solid mixture including the metal carbonate precursors and a lithium source is calcined to form the doped-LMR electroactive material of formula (1). The first and second stages may include one or more of the following steps.

In a first step, an aqueous precursor solution comprising a mixture of metal salts in a solvent may be prepared. The solvent may comprise water. The metal salts are the source of Mn, Ni, alkali metal and/or alkaline earth metals (A metals), and the optional one or more transition metals (Me metals), e.g., Co and/or Al during preparation of the doped-LMR electroactive material of formula (1). As such, the metal salts may comprise cations of Mn and Ni. In aspects, the metal salts may comprise cations of the one or more alkali metal and/or alkaline earth metals (A metals) and optionally cations of the one or more transition metals (Me metals), e.g., Co and/or Al. The metal salts may be in the form of carbonates, nitrates, sulfates, acetates, oxalates, or a combination thereof. In aspects, one or more of the metal salts may be in hydrate form. Examples of metal salts include manganese nitrate ($Mn(NO_3)_2$), nickel nitrate (Ni $(NO_3)_2$), manganese sulfate ($MnSO_4$), manganese sulfate tetrahydrate ($MnSO_4 \cdot 4H_2O$), nickel sulfate ($NiSO_4$), nickel sulfate hexahydrate ($NiSO_4 \cdot 6H_2O$), rubidium nitrate ($RbNO_3$), rubidium sulfate ($Rb_2SO_4$), cesium nitrate ($CsNO_3$), cesium sulfate ($Cs_2SO_4$), cobalt dinitrate hexahydrate ($Co(NO_3)_2 \cdot 6H_2O$), cobalt sulfate hydrate ($CoSO_4 \cdot xH_2O$), aluminum nitrate ($Al(NO_3)_3$), aluminum sulfate ($Al_2(SO_4)_3$), and combinations thereof. The metal salts may be present in the precursor solution at a concentration of greater than or equal to about 1 Molar to less than or equal to about 2 Molar. For example, the metal salts may be present in the precursor solution at a concentration of about 1.5 Molar.

In a second step, an ammonium carbonate solution is prepared. The ammonium carbonate solution comprises carbonate anions, $[CO_3]^{2-}$ and ammonium cations, $[NH_4]^+$. The ammonium carbonate solution may comprise a mixture of a carbonate precipitating agent and a base dissolved in a solvent, which may comprise water. Examples of carbonate precipitating agents include sodium carbonate ($Na_2CO_3$), ammonium bicarbonate ($NH_4HCO_3$), ammonium carbonate ($(NH_4)_2CO_3$), and combinations thereof. The base is included in the ammonium carbonate solution to control and/or adjust the pH of the ammonium carbonate solution to facilitate precipitation of the metal carbonates. Examples of bases include sodium hydroxide (NaOH) and ammonium hydroxide ($NH_4OH$). In one form, the ammonium carbonate solution may comprise a mixture of sodium carbonate ($Na_2CO_3$) and ammonium hydroxide ($NH_4OH$) in an aqueous solvent (e.g., water). The concentration of the ammonium cations, $[NH_4]^+$, in the ammonium carbonate solution may be greater than or equal to about 0.01 Molar, or optionally about 0.05 Molar, to less than or equal to about 0.5 Molar, or optionally about 0.2 Molar. For example, the concentration of the $[NH_4]^+$ in the ammonium carbonate solution may be about 0.09 Molar.

In a third step, the ammonium carbonate solution may be introduced into the precursor solution to form a slurry including a solid precipitate phase and a liquid phase. The ammonium carbonate solution may be introduced into the precursor solution at a temperature of greater than or equal to about 50° C. to less than or equal to about 70° C., or about 60° C. The ammonium carbonate solution may be introduced into the precursor solution at a stir speed of about 1000 rpm and optionally in an inert gas atmosphere (e.g., $N_2$). In some aspects, the ammonium carbonate solution may be introduced into the precursor solution by simultaneously introducing the ammonium carbonate solution and the precursor solution into a reactor including a volume of water (e.g., 850 mL). For example, the ammonium carbonate solution may be introduced into the reactor at a feed rate of about 2.1 milliliters per hour (mL/hr) and, at the same time, the precursor solution may be introduced into the reactor at a feed rate of about 8.4 mL/hr. The amount of the ammonium carbonate solution introduced into the precursor solution may be selected such that a molar ratio of the metal cations in the precursor solution to the ammonium cations in the ammonium carbonate solution is greater than or equal to about 0.03 and less than or equal to about 0.04. The pH of the ammonium carbonate solution, the precursor solution, and/or the slurry may be controlled or adjusted (e.g., by addition of a basic or acidic solution) such that the slurry exhibits a pH of greater than or equal to about 7, or optionally about 7.7, and less than or equal to about 9, or optionally about 8, during formation of the precipitate phase. After the ammonium carbonate solution is introduced into the precursor solution, the slurry may be held at a temperature of greater than or equal to about 50° C. to less than or equal to about 70° C., or about 60° C., with stirring for about 8 hours.

The solid precipitate phase will comprise a metal carbonate, e.g., manganese nickel carbonate ($MnNiCO_3$). In aspects, the solid precipitate phase may comprise a carbonate of Mn, Ni, and one or more Me metals, i.e., a carbonate represented by the formula $MnNiMeCO_3$. Additionally or alternatively, the solid precipitate phase may comprise a carbonate of one or more A metals, i.e., a carbonate represented by the formula $ACO_3$ (e.g., $RbCO_3$ and/or $CsCO_3$).

In a fourth step, the solid precipitate phase may be separated from the liquid phase, for example, by vacuum filtration, washed with deionized water to remove reaction byproducts (e.g., Na ions and other water-soluble ions) therefrom, and then dried. The solid precipitate by be dried, for example, in a vacuum oven set at 80° C. for 24 hours. The solid precipitate may comprise substantially spherical particles having a mean particle diameter of greater than or equal to about 1 micrometer (µm), or optionally about 5 µm, to less than or equal to about 20 µm, or optionally about 15 µm.

In a fifth step, a metal carbonate precursor mixture may be prepared including carbonates of Mn, Ni, and/or A, and optionally Me in the same molar ratios as set forth in the doped-LMR electroactive material of formula (1). In some aspects, the above-described co-precipitation method may be used to prepare a metal carbonate precursor mixture including Mn, Ni, A, and optionally Me in the desired proportions, for example, by controlling the respective amounts of Mn, Ni, A, and optionally Me in the precursor solution. For example, the respective amounts of Mn and Ni in the precursor solution may be controlled to achieve a molar ratio of Mn to Ni in the precursor solution (and in the resulting metal carbonate precipitate) of greater than or equal to about one (1), optionally about 2, or optionally about 3, and less than or equal to about 5, or optionally about 4. In other aspects, carbonates of Mn, Ni, A, and/or optionally Me may be prepared separately and then mixed together to achieve the same molar ratios as set forth in the doped- LMR electroactive material of formula (1). For example, $MnNiCO_3$ or $MnNiMeCO_3$ may be prepared by the above-described co-precipitation method and carbonates of one or more A metals ($ACO_3$) may be prepared separately by the above-described co-precipitation method or by another suitable method. Then, the $MnNiCO_3$ or $MnNiMeCO_3$ and the $ACO_3$ may be mixed together to form a metal carbonate precursor mixture in which the Mn, Ni, A, and optionally Me are present in the mixture in the same molar ratios as set forth in the doped-LMR electroactive material of formula (1).

In a sixth step, the metal carbonate precursor mixture is combined with a lithium source to form a solid-state mixture. The lithium source may comprise lithium metal and/or a lithium salt. The lithium salt may comprise lithium and a heat-labile anion (e.g., nitrate ($[NO_3]^{2-}$), carbonate ($[CO_3]^{2-}$), and combinations thereof). In aspects, the lithium source may comprise lithium carbonate ($Li_2CO_3$). The metal carbonate precursor mixture and the lithium source are calcined to form the doped-LMR electroactive material of formula (1). The metal carbonate precursor mixture and the lithium source may be mixed together in suitable amounts to achieve the molar ratios of Li, Mn, Ni, A, and optionally Me set forth in the doped-LMR electroactive material of formula (1). For example, the metal carbonate precursor mixture and the lithium source may be mixed together such that a molar ratio of A to Li in the mixture is greater than or equal to about 0.005, optionally about 0.008, or optionally about 0.01 and less than or equal to about 0.1, or optionally about 0.05.

The mixture of the metal carbonate precursor mixture and the lithium source may be ground together to form a substantially homogenous mixture.

The mixture of the metal carbonate precursor mixture and the lithium source is calcined to form the doped-LMR electroactive material of formula (1). The mixture of the metal carbonate precursor mixture and the lithium source may be calcined by heating the mixture in an oxygen-containing environment (e.g., air) at a temperature of about 700° C. to about 1000° C. for a duration of about 12 hours to about 36 hours. During calcination of the metal carbonate precursor mixture and the lithium source, gaseous reaction byproducts of oxygen ($O_2$) and carbon dioxide ($CO_2$) may be released therefrom. In some aspects, the mixture of the metal carbonate precursor mixture and the lithium source may be calcined in a step-wise manner. For example, the mixture of the metal carbonate precursor mixture and the lithium source may be calcined by heating the mixture from ambient temperature (e.g., about 25° C.) to a temperature of about 500° C. at a ramp rate of about 2° C. per minute (about 4 hours), heating the mixture to a temperature of about 900° C. at a ramp rate of about 2° C. per minute (about 3 hours), and then maintaining the mixture at a temperature of about 900° C. for about 12 hours. As another example, the mixture of the metal carbonate precursor mixture and the lithium source may be calcined by heating the mixture from ambient temperature to a temperature of about 500° C. at a ramp rate of about 2° C. per minute (about 4 hours), heating the mixture to a temperature of about 700° C. at a ramp rate of about 2° C. per minute (about 1.5 hours), heating the mixture to a temperature of about 900° C. at a ramp rate of about 2° C. per minute (about 1.5 hours), and then maintaining the mixture at a temperature of about 900° C. for about 12 hours.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The terminology used herein is for the purpose of describing example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended terms "comprises," "comprising," "including," and "having," are to be understood as non-restrictive terms used to describe and claim various embodiments set forth herein, in certain aspects, the terms may alternatively be understood to instead be a more limiting and restrictive term, such as "consisting of" or "consisting essentially of." Thus, for any given embodiment reciting compositions, materials, components, elements, ingredients, features, integers, operations, and/or process steps, the present disclosure also specifically includes embodiments consisting of, or consisting essentially of, such recited compositions, materials, components, elements, ingredients, features, integers, operations, and/or process steps. In the case of "consisting of," the alternative embodiment excludes any additional compositions, materials, components, elements, ingredients, features, integers, operations, and/or process steps, while in the case of "consisting essentially of," any additional compositions, materials, components, elements, ingredients, features, integers, operations, and/or process steps that materially affect the basic and novel characteristics are excluded from such an embodiment, but any compositions, materials, components, elements, ingredients, features, integers, operations, and/or process steps that do not materially affect the basic and novel characteristics can be included in the embodiment.

Any method steps, processes, and operations described herein are not to be construed as necessarily requiring their performance in the order discussed or illustrated, unless specifically identified as an order of performance. It is also to be understood that additional or alternative steps may be employed, unless otherwise indicated.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Throughout this disclosure, the numerical values represent approximate measures or limits to ranges and encompass minor deviations from the given values and embodiments, having about the value mentioned as well as those having exactly the value mentioned. Other than the working examples provided at the end of the detailed description, all numerical values of parameters (e.g., of quantities or conditions) in this specification are to be understood as being modified in all instances by the term "about" whether or not "about" actually appears before the numerical value. Numerical values of parameters in the appended claims are to be understood as being modified by the term "about" only when such term appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%. In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated. An "X-based" composition or material broadly refers to compositions or materials in which "X" is the single largest constituent of the composition or material on a weight percentage (%) basis. This may include compositions or materials having, by weight, greater than 50% X, as well as those having, by weight, less than 50% X, so long as X is the single largest constituent of the composition or material based upon its overall weight. When a composition or material is referred to as being "substantially free" of a substance, the composition or material may comprise, by weight, less than 5%, optionally less than 3%, optionally less than 1%, or optionally less than 0.1% of the substance.

As used herein, the term "metal" may refer to a pure elemental metal or to an alloy of an elemental metal and one or more other metal or nonmetal elements (referred to as "alloying" elements). The alloying elements may be selected to impart certain desirable properties to the alloy that are not exhibited by the base metal element.

What is claimed is:

1. A method of manufacturing a positive electrode material, the method comprising:

preparing a mixture comprising a transition metal carbonate, a dopant metal carbonate, and a lithium source, the transition metal carbonate comprising nickel and manganese, and the dopant metal carbonate comprising a dopant metal selected from the group consisting of sodium (Na), potassium (K), rubidium (Rb), cesium (Cs), magnesium (Mg), calcium (Ca), strontium (Sr), barium (Ba), and combinations thereof; and calcining the mixture to form an oxide represented by the formula (1):

$$Li_{1.2-x}A_x[Mn_{0.8-x-y-z}Ni_yMe_z]O_2, \tag{1}$$

where A is the dopant metal, Me is a metal selected from the group consisting of cobalt (Co), aluminum (Al), and combinations thereof, $0 < x \leq 0.12$, $0.1 \leq y \leq 0.5$, and $0 \leq z \leq 0.2$.

2. The method of claim 1, wherein a molar ratio of the dopant metal to lithium in the mixture is greater than or equal to about 0.005 and less than or equal to about 0.1.

3. The method of claim 1, wherein the transition metal carbonate comprises manganese nickel carbonate, and wherein a molar ratio of manganese to nickel in the transition metal carbonate is greater than or equal to about one (1) to less than or equal to about 5.

4. The method of claim 1, wherein the dopant metal comprises rubidium (Rb), cesium (Cs), or a combination thereof.

5. The method of claim 4, wherein x is about 0.01, y is about 0.24, and z=0.

6. The method of claim 1, wherein the transition metal carbonate further comprises cobalt (Co), aluminum (Al), or a combination thereof, and wherein $0 < z \leq 0.2$.

7. The method of claim 1, wherein the lithium source comprises lithium metal, a lithium salt, or a combination thereof.

8. The method of claim 1, wherein the mixture is calcined by heating the mixture in an oxygen-containing environment at a temperature of about 700 degrees Celsius to about 1000 degrees Celsius for about 12 hours to about 36 hours.

9. The method of claim 1, wherein the mixture is calcined by heating the mixture in an oxygen-containing environment from ambient temperature to a temperature of about 900 degrees Celsius at ramp rate of about 2 degrees Celsius per minute, and then maintaining the mixture at a temperature of about 900 degrees Celsius for about 12 hours.

10. The method of claim 1, further comprising:

prior to calcining the mixture, grinding the transition metal carbonate, the dopant metal carbonate, and the lithium source together to form a powder.

11. The method of claim 1, further comprising:

preparing a precursor solution comprising a metal salt in a solvent, the metal salt comprising nickel and manganese;

introducing an ammonium carbonate solution into the precursor solution to form a slurry including a liquid phase and a solid precipitate phase comprising the transition metal carbonate; and separating the solid precipitate phase from the liquid phase.

12. The method of claim 11, wherein the metal salt further comprises the dopant metal, and wherein the solid precipitate phase further comprises the dopant metal carbonate.

13. The method of claim 11, wherein the metal salt comprises a carbonate, nitrate, sulfate, acetate, oxalate, or a combination thereof, and wherein the solvent comprises water.

14. The method of claim 11, wherein the precursor solution comprises metal cations and the ammonium carbonate solution comprises ammonium cations ($[NH_4]^+$), and wherein a molar ratio of the metal cations in the precursor solution to the ammonium cations in the ammonium carbonate solution is greater than or equal to about 0.03 and less than or equal to about 0.04.

15. The method of claim 11, further comprising:

adjusting the pH of the slurry such that the slurry exhibits a pH of greater than or equal to 7.7 and less than or equal to 8.

16. A method of manufacturing a positive electrode material, the method comprising:

preparing a precursor solution comprising a metal salt in a solvent, the metal salt comprising nickel, manganese, and a dopant metal comprising rubidium (Rb), cesium (Cs), or a combination thereof;

introducing an ammonium carbonate solution into the precursor solution to form a slurry including a solid precipitate phase comprising a transition metal carbonate comprising nickel and manganese and a dopant metal carbonate comprising the dopant metal;

preparing a mixture comprising the transition metal carbonate, the dopant metal carbonate, and a lithium source; and calcining the mixture in an oxygen-containing environment at a temperature of 700 degrees Celsius to 1000 degrees Celsius to form an oxide represented by the formula $Li_{1.2-x}A_x[Mn_{0.8-x-y}Ni_y]O_2$, where A is the dopant metal, $0.005 < x \leq 0.05$ and $0.2 \leq y \leq 0.3$.

17. The method of claim 16, wherein x is about 0.01 and y is about 0.24.

18. The method of claim 16, wherein the precursor solution comprises metal cations and the ammonium carbonate solution comprises ammonium cations ($[NH_4]^+$), wherein a molar ratio of the metal cations in the precursor solution to the ammonium cations in the ammonium carbonate solution is greater than or equal to about 0.03 and less than or equal to about 0.04, and wherein the slurry has a pH of greater than or equal to 7.7 and less than or equal to 8.

19. The method of claim 18, wherein the solid precipitate phase comprises substantially spherical particles having aspect ratios of less than 10 and a mean particle diameter of greater than or equal 1 micrometer and less than or equal to 15 micrometers.

20. The method of claim 16, further comprising:

mixing the oxide of formula (1) with a polymer binder and an electrically conductive material to form a positive electrode.

* * * * *